(12) United States Patent
Khandekar et al.

(10) Patent No.: US 9,042,840 B2
(45) Date of Patent: May 26, 2015

(54) CROSS-CARRIER/CROSS-SUBFRAME INDICATION IN A MULTI-CARRIER WIRELESS NETWORK

(75) Inventors: Aamod Dinkar Khandekar, San Diego, CA (US); Wanshi Chen, San Diego, CA (US); Ravi Palanki, San Diego, CA (US); Jaber Mohammad Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1229 days.

(21) Appl. No.: 12/917,347

(22) Filed: Nov. 1, 2010

(65) Prior Publication Data
US 2011/0105050 A1    May 5, 2011

Related U.S. Application Data

(60) Provisional application No. 61/257,300, filed on Nov. 2, 2009.

(51) Int. Cl.
*H04B 1/00* (2006.01)
*H04B 7/00* (2006.01)
*H04L 5/00* (2006.01)

(52) U.S. Cl.
CPC .............. *H04L 5/0053* (2013.01); *H04L 5/001* (2013.01); *H04L 5/0094* (2013.01)

(58) Field of Classification Search
CPC ........................... H04L 5/0094; H04L 5/0053
USPC ............................................................. 455/68
See application file for complete search history.

(56) References Cited

U.S. PATENT DOCUMENTS

| 7,197,022 | B2 * | 3/2007 | Stanwood et al. ............. 370/337 |
| 8,169,953 | B2 | 5/2012 | Damnjanovic et al. |
| 2002/0041635 | A1 | 4/2002 | Ma et al. |

FOREIGN PATENT DOCUMENTS

| WO | WO-2006125149 A2 | 11/2006 |
| WO | WO-2009041785 A2 | 4/2009 |
| WO | WO-2009045011 A1 | 4/2009 |
| WO | WO2010105255 A2 | 9/2010 |
| WO | WO2010141912 | 12/2010 |

OTHER PUBLICATIONS

LG Electronics, "PDCCH structure for multiple component carriers", 3GPP TSG RAN WG1 #56 R1-090653, Athens, Greece, Feb. 9-13, 2009, pp. 4.

(Continued)

*Primary Examiner* — Eugene Yun

(57) ABSTRACT

Techniques for cross-subframe and cross-carrier scheduling of uplink and downlink transmissions in a multi-carrier wireless communication system are disclosed. A base station can include cross-subframe, carrier indication (xSF/CIF) information in a PDCCH message to signal to a user equipment (UE) which subframes and/or component carriers pertain to control information carried therein. The UE may utilize the xSF/CIF information to determine to which subframes and/or component carriers the control information is to be applied.

44 Claims, 8 Drawing Sheets

(56) References Cited

OTHER PUBLICATIONS

Huawei, "Issues on Cross-Carrier PDCCH Indication for Carrier Aggregation", 3GPP Draft, R1-093047 Issues on Cross-Carrier PDCCH Indication for Carrier Aggregation, 3rd Generation Partnership Project (3GPP), Mobile Competence Centre, 650, Route Des Lucioles, F-06921 Sophia-Antipolis Cedex, France, No. Shenzhen, China, Aug. 18, 2009, XP050351439, [retrieved on Aug. 18, 2009].
International Search Report and Written Opinion—PCT/US2010/055143, International Search Authority—European Patent Office—Mar. 31, 2011.
Qualcomm Europe: "Interpreting the Carrier Indicator Field", 3GPP Draft, R1-094206 Interpretation of the Carrier Indicator Field, 3rd Generation Partnership Project (3GPP), Mobile Competence Centre, 650, Route Des Lucioles, F-06921 Sophia-Antipolis Cedex, France, No. Miyazaki, Oct. 12, 2009, XP050388676, [retrieved on Oct. 6, 2009].
Project (3GPP), Mobile Competence Centre, 650, Route Des Lucioles, F-06921 Sophia-Antipolis Cedex, France, No. Ljubljana, Jan. 7, 2009, XP050318205, [retrieved on Jan. 7, 2009].
Taiwan Search Report—TW099137659—TIPO—Jun. 20, 2013.
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, No. Ljubljana, Jan. 7, 2009, XP050318205, pp. 1-5, [retrieved on Jan. 7, 2009].
3GPP TS 36.213 V8.8.0, LTE, Evolved Universal Terrestrial Radio Access (E-UTRA),Physical Layers Procedures, V8.8.0, Release 8, Oct. 2009, pp. 1-79.

\* cited by examiner

CROSS-CARRIER/CROSS-SUBFRAME INDICATION IN A MULTI-CARRIER WIRELESS NETWORK

CLAIM OF PRIORITY UNDER 35 U.S.C. §119

The present Application for Patent claims priority to U.S. Provisional Application No. 61/257,300, entitled, "Apparatus and Method For Cross-Carrier Indication And Cross-Subframe Indication In LTE-A Wireless Communication System," filed Nov. 2, 2009, and assigned to the assignee hereof and expressly incorporated herein by reference.

BACKGROUND

1. Field of the Invention

The present disclosure relates generally to communication, and more specifically to control information for scheduling transmissions in a multi-carrier wireless communication network.

2. Background

The 3rd Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). The LTE provides for an uplink speed of up to 50 megabits per second (Mbps) and a downlink speed of up to 100 Mbps and brings many technical benefits to cellular networks. The LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

SUMMARY

According to certain aspects, a method for wireless communications is provided. The method generally includes generating control information for scheduling transmissions in one or more subframes and transmitting the control information to a user equipment in a downlink control channel. The control information may include at least one field having different values that indicate different combinations of one or more subframes and one or more component carriers to which the control information is to be applied.

According to certain aspects, a method for wireless communications is provided. The method generally includes receiving control information in a downlink control channel. The control information may include at least one field having different values that indicate different combinations of one or more subframes and one or more component carriers to which the control information is to be applied. The method also includes determining, based on a value of the at least one field, a combination of one or more subframes and one or more component carriers to which the control information is to be applied.

According to certain aspects, an apparatus for wireless communications is provided. The apparatus generally includes means for generating control information for scheduling transmissions in one or more subframes and means for transmitting the control information to a user equipment in a downlink control channel. The control information may include at least one field having different values that indicate different combinations of one or more subframes and one or more component carriers to which the control information is to be applied.

According to certain aspects, an apparatus for wireless communications is provided. The apparatus generally includes means for receiving control information in a downlink control channel. The control information may include at least one field having different values that indicate different combinations of one or more subframes and one or more component carriers to which the control information is to be applied. The apparatus also includes means for determining, based on a value of the at least one field, a combination of one or more subframes and one or more component carriers to which the control information is to be applied.

According to certain aspects, an apparatus for wireless communications is provided. The apparatus generally includes a scheduling component configured to generate control information for scheduling transmissions in one or more subframes and a transmitting component configured to transmit the control information to a user equipment in a downlink control channel. The control information may include at least one field having different values that indicate different combinations of one or more subframes and one or more component carriers to which the control information is to be applied.

According to certain aspects, an apparatus for wireless communications is provided. The apparatus generally includes a receiving component configured to receive control information in a downlink control channel. The control information may include at least one field having different values that indicate different combinations of one or more subframes and one or more component carriers to which the control information is to be applied. The apparatus also includes a scheduling component configured to determine, based on a value of the at least one field, a combination of one or more subframes and one or more component carriers to which the control information is to be applied.

According to certain aspects, a computer-program product for wireless communications, comprising a computer readable medium having instructions stored thereon is provided. The instructions being executable by one or more processors and generally including instruction for generating control information for scheduling transmissions in one or more subframes and instruction for transmitting the control information to a user equipment in a downlink control channel. The control information may include at least one field having different values that indicate different combinations of one or more subframes and one or more component carriers to which the control information is to be applied.

According to certain aspects, a computer-program product for wireless communications, comprising a computer readable medium having instructions stored thereon is provided. The instructions being executable by one or more processors and generally including instructions for receiving control information in a downlink control channel. The control information may include at least one field having different values that indicate different combinations of one or more subframes and one or more component carriers to which the control information is to be applied. The instructions may also include instructions for determining, based on a value of the at least one field, a combination of one or more subframes and one or more component carriers to which the control information is to be applied.

DETAILED DESCRIPTION

Figure 1:
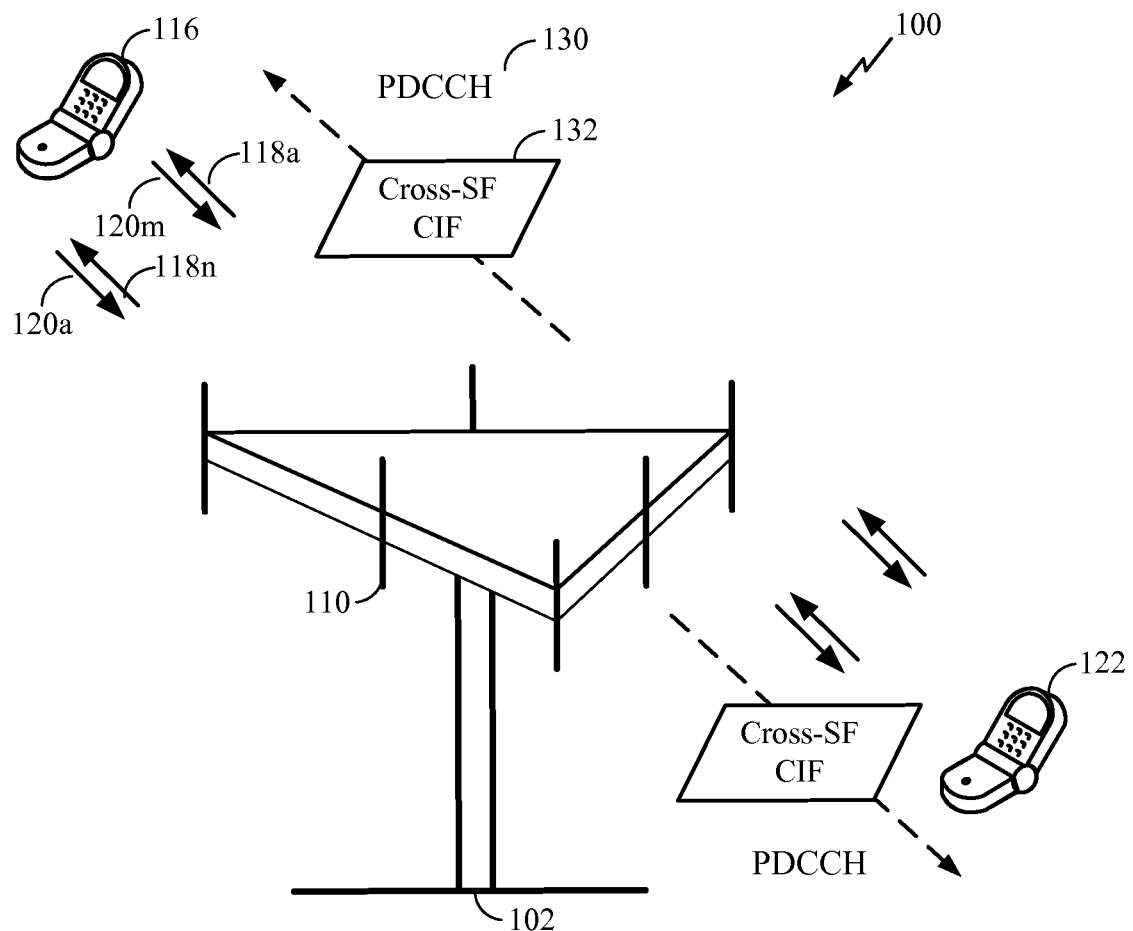
FIG. 1 illustrates a multi-carrier multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can be also called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention, especially in uplink communications where lower PAPR benefits the mobile terminal in terms of transmit power efficiency.

Referring to FIG. 1, a multi-carrier wireless communication system 100 according to certain aspects of the present disclosure is illustrated.

An access point 102 (AP) includes one or more antennas 110 for communicating with user equipment (UEs) 116, 122.

Access point 102 may be a fixed station and may be referred to as a base station, Node B, an evolved Node B (eNB) or some other terminology.

UEs 116, 122 can be wireless terminals or other devices as previously indicated. As shown, a first user equipment (UE) 116 may communicate with access point 102 via one or more uplinks 120 and downlinks 118 utilizing multiple carriers (also referred to as "component carriers" or "CCs"). Illustratively, a plurality of CCs are used for a plurality of uplinks (120a-120m) and a plurality of downlinks (118a-118n). Although a greater number of downlinks than uplinks is shown in this example, according to certain aspects, an even (symmetrical) number of downlinks and uplinks may be configured or a greater number of uplinks than downlinks may be configured.

As illustrated, a second UE 122 may also be configured to communicate with the access point 102 via multiple CCs. Further, a UE may be configured to communicate with one or more different CCs on an uplink than are used to communicate on the downlink. It will be recognized that such configurations can be symmetric (one downlink carrier for each uplink CC) or asymmetric (differing numbers of uplink and downlink CCs).

Wireless communication system 100 may include additional access points and UEs (not shown) and each UE may be individually configured with downlink and uplink component carriers for multi-carrier operation. Thus, while both UEs 116 and 122 are illustrated as communicating using the same CCs, in some cases, different UEs may be configured to communicate with different CCs.

As will be described in greater detail below, the access point 102 may be capable of simultaneously scheduling transmissions for a UE that occur in different subframes ("cross-subframe"), that occur on different component carriers ("cross-carrier"), or that occur both in different subframes and on different component carriers. The scheduling may involve various types of information related to the transmissions, such as when transmissions occur on a downlink or uplink, power control commands to be applied on uplink transmissions, information regarding Hybrid Automatic Repeat request transmissions, channel quality indicator (CQI) requests, and the like.

As illustrated in FIG. 1, according to certain aspects, the scheduling information may be transmitted in a physical downlink control channel (PDCCH) with at least one field having different values that indicate different combinations of one or more subframes and one or more component carriers to which the control information is to be applied. For example, as illustrated, the PDCCH may include a cross-subframe (SF)/cross-carrier indicator field (xSF/CIF) 132. As will be described in greater detail below, different values of the xSF/CIF field 132 may be mapped to different subframes across different CCs. It will also be recognized that the xSF/CIF field 132 is not limited to a single field, but may include more than one field (e.g., a single field to specify one or more CCs and a single field to specify one or more subframes).

According the certain aspects, the particular mapping may be signaled by the AP 102, the mapping may be updated periodically (e.g., based on changing conditions to channel, interference avoidance, and/or loading), and different mappings may be provided to different UEs.

Figure 2:
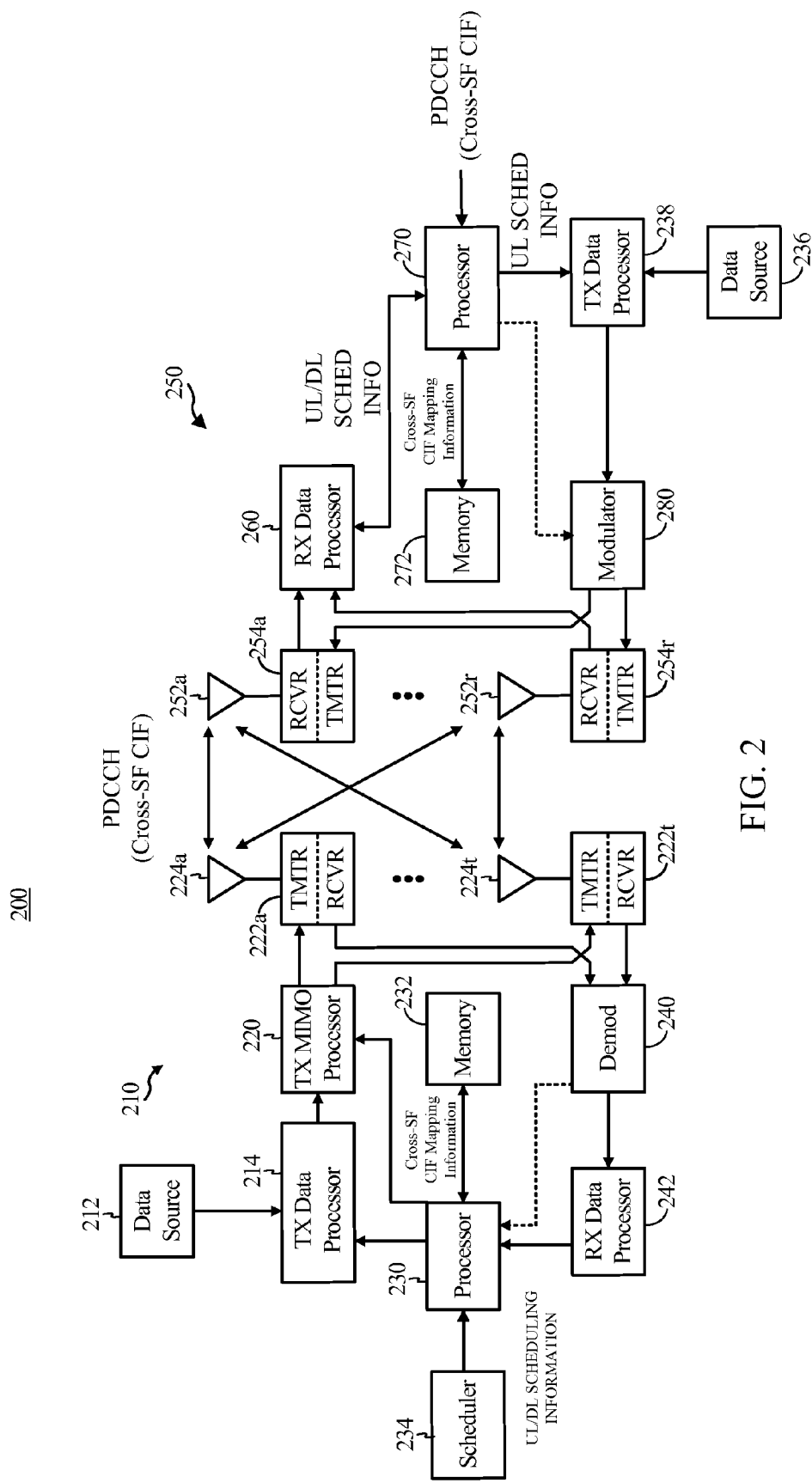
FIG. 2 illustrates a block diagram of example components of a multi-carrier multiple access wireless communication system, in accordance with certain aspects of the present disclosure.

FIG. 2 is a block diagram 200 showing example components of an exemplary base station 210 and access terminal 250 in a multi-carrier wireless communication system 200. The base station 210 can be an access point such as access point 102 and the access terminal 250 can be a user equipment such as UE 116.

At the base station 210, traffic data for a number of data streams is provided from a data source 212 to a transmit (TX) data processor 214. A controller/processor 230 may generate control information to be transmitted to the AT 250. As illustrated, the processor 230 may also retrieve mapping information indicating how different values of an xSF/CIF field map to different subframes and/or component carriers from a memory 232. The processor 230 may utilize this information to generate an appropriate value for the xSF/CIF field, based on UL/DL scheduling information obtained from a scheduler 234, for inclusion with a PDCCH sent in a downlink transmission.

A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process symbol streams for each downlink component carrier to provide one or more analog signals, and further condition (e.g., amplify filter, and upconvert) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) of the receivers 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, including scheduling information transmitted in the PDCCH.

The processing by RX data processor 260 may be complementary to that performed by TX MIMO processor 220 and TX data processor 214 at base station 210. A controller/processor 270, coupled to a memory 272, periodically determines which pre-coding matrix to use (discussed below). The processor 270 may also formulate an uplink message comprising a matrix index portion and a rank value portion.

The processor 270 may receive scheduling information sent in the PDDCH. The processor 270 may determine to which subframes and on which component carriers to apply the scheduling information, based on a value of the xSF/CIF field and a mapping of its values. The mapping information may be signaled in a separate transmission, such as a higher-layer configuration message, and stored in memory 272 where it can be retrieved by processor 270.

An uplink (reverse link) message may comprise various types of information regarding the communication link and/or the received data stream. The uplink message may be processed by a TX data processor 238, which also receives traffic data for a number of data streams from a data source 236, modulated by a modulator 280, and conditioned by transmitters 254a through 254r. Based on the scheduling information received with the downlink control information, the processor 270 can determine which subframes and/or CCs to transmit the message and also may adjust the transmit power of one or more of its uplink component carriers.

At the base station 210, the uplink transmissions from access terminal 250 are received by antennas 224, conditioned by receivers 222, demodulated by a demodulator 240, and processed by a RX data processor 242 to extract the reserve link message transmitted by the access terminal 250. The processor 230 at base station 210 can then determine various parameters, such as which pre-coding matrix to use for determining beamforming weights, and continue processing the extracted message.

In systems where multi-carrier operation is supported, the AT 250 may be configured to monitor and be served by two or more component carriers (CCs). In such systems, cross-carrier signaling may be supported to facilitate efficient control. This may be particularly desirable in the context of heterogeneous networks where different types of cells (e.g., macro, pico, and Femto-cells) are overlayed that have access points that transmit with varying levels of power.

Cross-carrier signaling may be realized at the base station 210, in some cases, by utilizing a carrier indicator field (CIF) implemented as 0-3 bits in a PDCCH. A 0 bit CIF (no CIF) may indicate control information in the PDCCH is only for a given CC (e.g., on which it is transmitted). A 1-3 bits CIF may indicate that information in the PDCCH controls a given CC, and other CCs. The mapping of the CIF to the CCs may be conveyed to the access terminal 250 with higher layer signaling. As described above, such a CIF field may also be implemented as a xSF/CIF field having different values that indicate different combinations of one or more subframes and one or more component carriers to which the control information is to be applied.

There may be different types of CCs, for example, to provide backward compatibility to access terminals that are compatible with earlier versions of a standard ("legacy ATs" or "legacy UEs"). Such a combination of CCs may bring not only enhanced AT throughput, but also more efficient interference management especially for heterogeneous networks.

For example, to mitigate interference, resources may be partitioned such that, in a given subframe, devices in one cell are allowed to transmit, while devices in potentially interfering cells do not transmit. This resource partitioning may be communicated to all devices in the heterogeneous network.

In accordance with the present disclosure, one or more uplink carriers may be assigned to an AT capable of multicarrier operation (e.g., an AT operating in compliance with developing LTE standards) and one or more subframes on one or more of the component carriers may be identified for purposes of scheduling transmissions. Certain specific aspects of the disclosure provide mapping rules for scheduling transmissions on symmetric/asymmetric UL/DL carrier configurations.

In accordance with certain standards, such as the long term evolution (LTE) standard Release 8, radio frames may be partitioned into subframes, with different partitioning of these subframes between uplink and downlink transmissions. As an example, in one configuration for LTE Release 8 TDD systems, within one frame, subframes are partitioned as shown in Table 1 below:

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U | where D stands of downlink subframes, S for special subframes which contain symbols for downlink, guard, and uplink, and U for uplink subframes.

As shown, in this configuration there are more uplink subframes than downlink in one radio frame. As a result, it may be desirable for control information sent in one PDCCH to schedule two or more uplink subframes simultaneously. According to some aspects, this may be accomplished utilizing an uplink index (UL index). This UL index may, for example, indicate in which uplink subframe a PUSCH transmission should be used for HARQ purposes, relative to a downlink transmission in which a PDCCH and/or PHICH transmission was detected. A UL index may also be used to indicate one or more uplink subframes in which a power control command is to be applied. A UL index may also be used to specify subframes for purposes of reporting CQI.

According to certain aspects, a PDCCH with control information for scheduling transmissions may include one or more fields to indicate one or more subframes on one or more cross-carriers to which the scheduling control information is to be applied.

Figure 3:
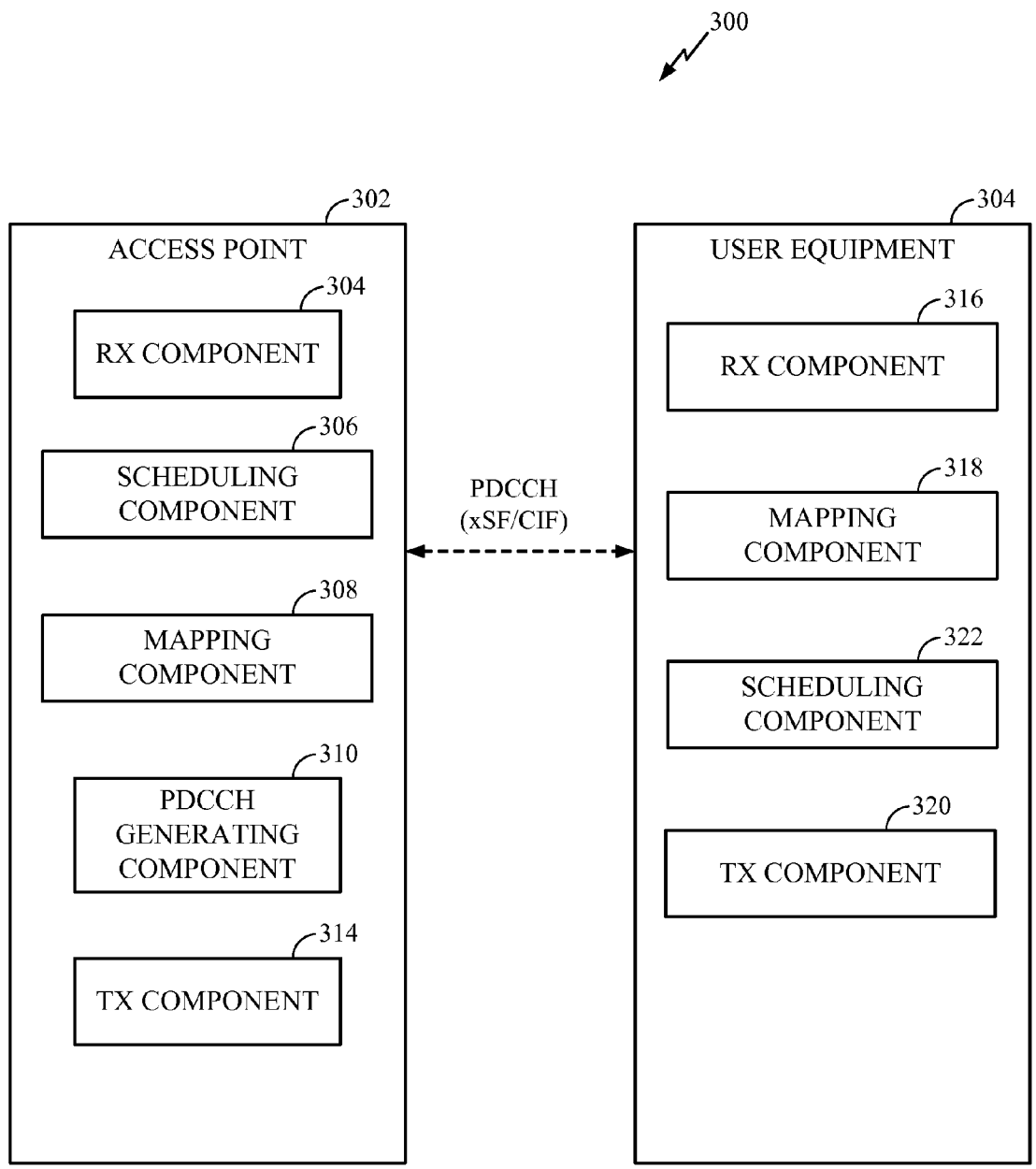
FIG. 3 illustrates example components of a wireless communication system, in accordance with certain aspects of the present disclosure.

FIG. 3 illustrates an example communication system 300 capable of conveying control information for scheduling transmissions on for a plurality of CCs across a plurality of subframes, in accordance with certain aspects of the present disclosure.

As illustrated, the communication system 300 may comprise an access point 302 and one or more user equipments 304, each of which may be as described in connection with FIGS. 1-2. For multi-carrier operation, the access point 302 may generate scheduling information across multiple subframes for each component carrier of the UE 304 and transmit the scheduling information to the UE 304.

According to certain aspects, the access point 302 may send information regarding the mapping of different values of a cross-subframe (cross-SF) Carrier indicator field (CIF) and subframes on the component carriers to the UE 304. These mappings may allow the UE 304 to determine to which components carrier(s) and/or to which subframes the control information is to be applied. Advantageously, in the presently described embodiment, the mappings may be specific to a UE and may be dynamically updated (e.g., via higher layer signaling), allowing greater flexibility in partitioning resources which may help adapt to various system conditions, for example, allowing for interference management in heterogeneous networks or load balancing.

In one aspect, the access point 302 may include a scheduling component 306 which generates information regarding uplink and downlink transmissions on different subframes on one or more component carriers. The scheduling information may be provided to a mapping component 308 that generates a xSF/CIF value based on the mappings described above. A PDCCH generating component 310 may generate a PDCCH with the scheduling information and xSF/CIF for transmission by a multi-carrier transmitting component 314. The AP 302 may also include a multi-carrier receive component 305 configured to receive uplink transmissions transmitted in accordance with scheduling information conveyed in the PDCCH.

As illustrated, the UE 304 may include components for performing complementary processing to the components shown in the access point 302. For example, the UE 304 may include a multi-carrier RX component 316, a mapping component 318, a scheduling component 322, and a multi-carrier transmitting component 320. The mapping component 318 may receive the xSF/CIF and determine, based on the mapping information (e.g., configured via higher layer signaling), one or more component carriers and/or subframes to which the scheduling information pertains. The scheduling component 322 may then provide this information to the RX component 316 for use in processing downlink transmissions and to the TX component 320 for use in processing uplink transmissions (e.g., for adjusting transmit power or transmitting HARQ ACK/NACKs).

Figure 4:
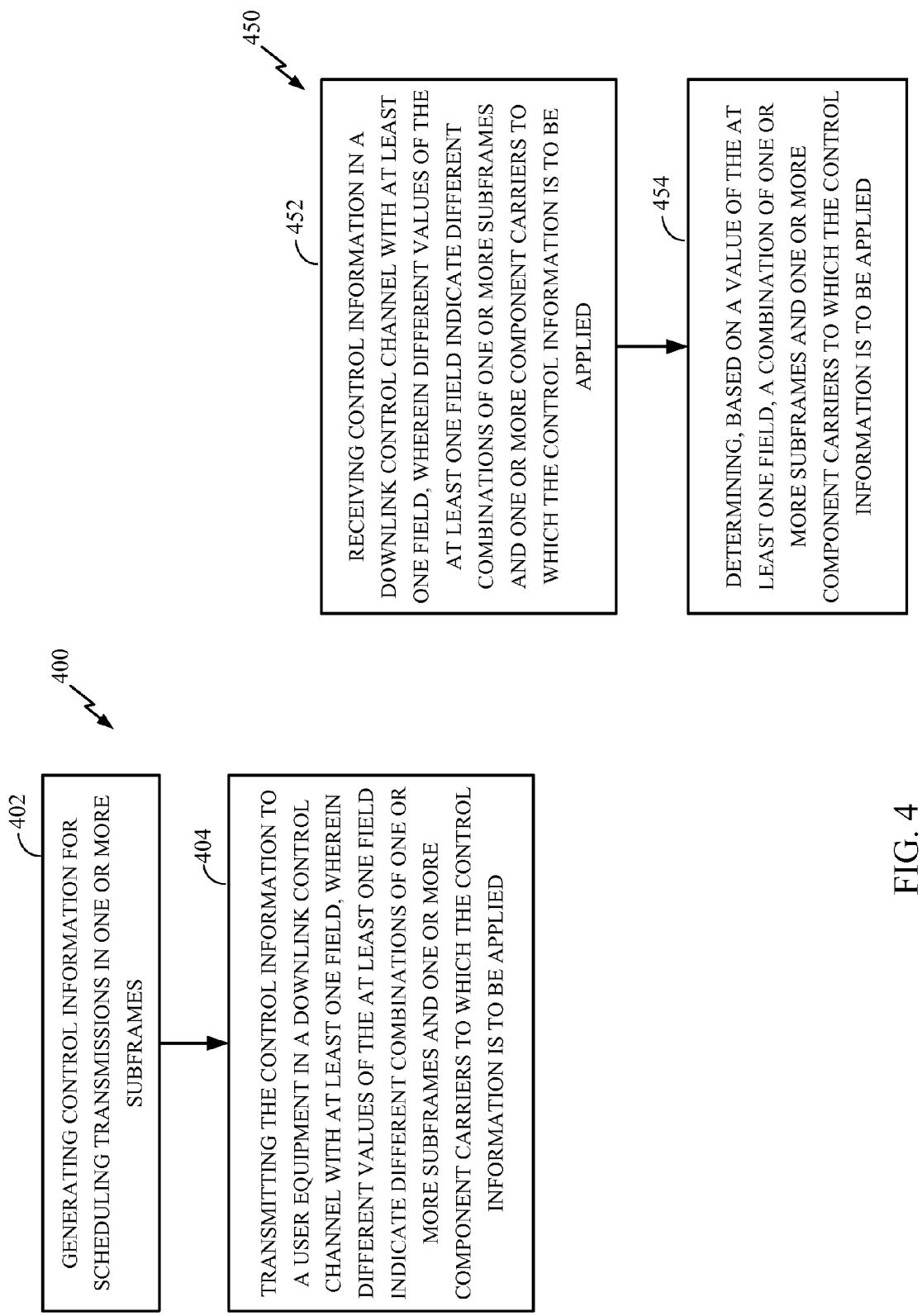
FIG. 4 illustrates example operations for scheduling transmissions in a multi-carrier system, in accordance with certain aspects of the present disclosure.

FIG. 4 illustrates example operations 400 and 450 that may be performed by an access point and user equipment, respectively, to schedule a data transmission across component carriers and/or across subframes, in accordance with certain aspects of the present disclosure.

An access point and UE performing the operations may be as described in connection with any of FIGS. 1-3. For instance, exemplary operations 400 may be directed by one or more processors (such as processor 230), or by one or more components (such as components 305-314), while exemplary operations 450 may be directed by one or more processors (such as processor 270), or by one or more components (such as components 316-322).

At 402, the AP generates control information for scheduling transmissions in one or more subframes. At 404, the AP transmits the control information to a user equipment in a downlink control channel with at least one field, wherein different values of the at least one field indicate different combinations of one or more subframes and one or more component carriers to which the control information is to be applied. For example, the AP may transmit the control information in a PDCCH with a cross-subframe CIF.

At 452, the UE receives control information in a downlink control channel with at least one field, wherein different values of the at least one field indicate different combinations of one or more subframes and one or more component carriers to which the control information is to be applied. At 454, the UE determines, based on a value of the at least one field, a combination of one or more subframes and one or more component carriers to which the control information is to be applied.

According to certain aspects, a first mapping of values of the at least one field to different combinations of subframes and component carriers may be signaled to a first user equipment and a second mapping of values of the at least one field to different combinations of subframes and component carriers may be signaled to a second user equipment.

As noted above, the xSF/CIF may indicate the control information is to be applied in one or more subframes in the same or different component carriers used to transmit the PDCCH.

Figure 5:
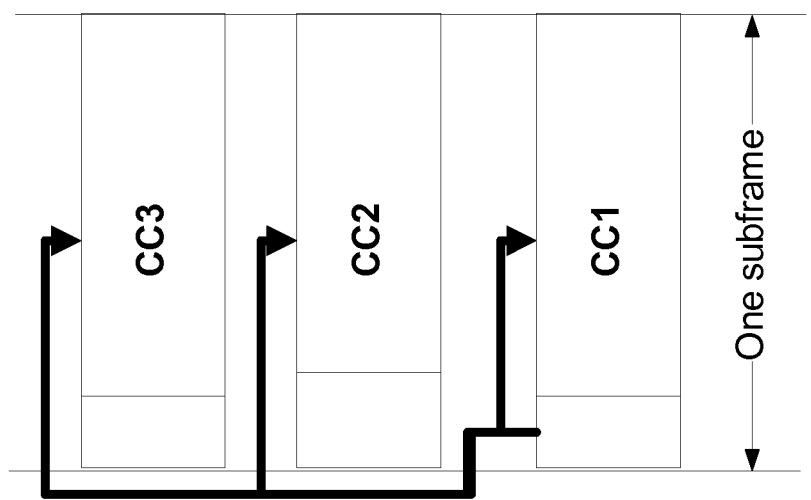
FIGS. 5-7 illustrate example cross-carrier/cross-subframe indicator field mappings, in accordance with certain aspects of the present disclosure.

For example, as illustrated in FIG. 5, in some cases a xSF/CIF may schedule transmissions in a purely cross-carrier manner. In the illustrated example, in one time instance, xSF/CIF indicates a PDCCH on CC1 schedules transmissions on CC2 and CC3 in the same subframe.

Figure 6:
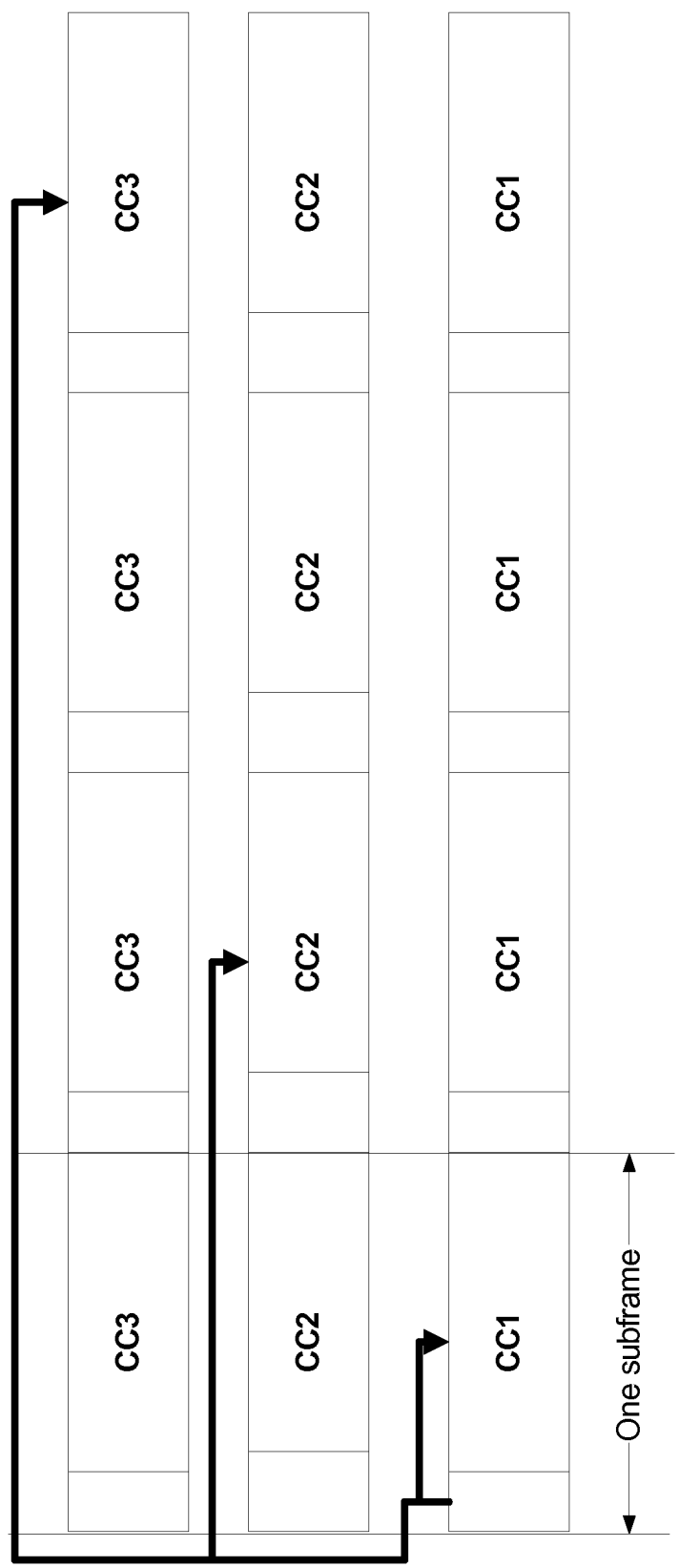

As illustrated in FIG. 6, in a different time instance, xSF/CIF may indicate the PDCCH schedules transmissions on CC2 and CC3 data transmissions across different subframes (cross-carrier and cross-subframe). To realize the example illustrated in FIGS. 5 and 6, the mapping of xSF/CIF values may take both cross-carrier and cross-subframe into account. In the example, a PDCCH sent on CC1 in subframe n can schedule CC1 (subframe n data transmission), CC2 (subframe n and n+1 data transmissions), and CC3 (subframe n and n+3 data transmissions). An example mapping of 3-bit xSF/CIF values may then be defined accordingly, for example, as:

000: CC1, n
001: CC2, n
010: CC2, n+1
011: CC3, n
100: CC3, n+3

Figure 7:
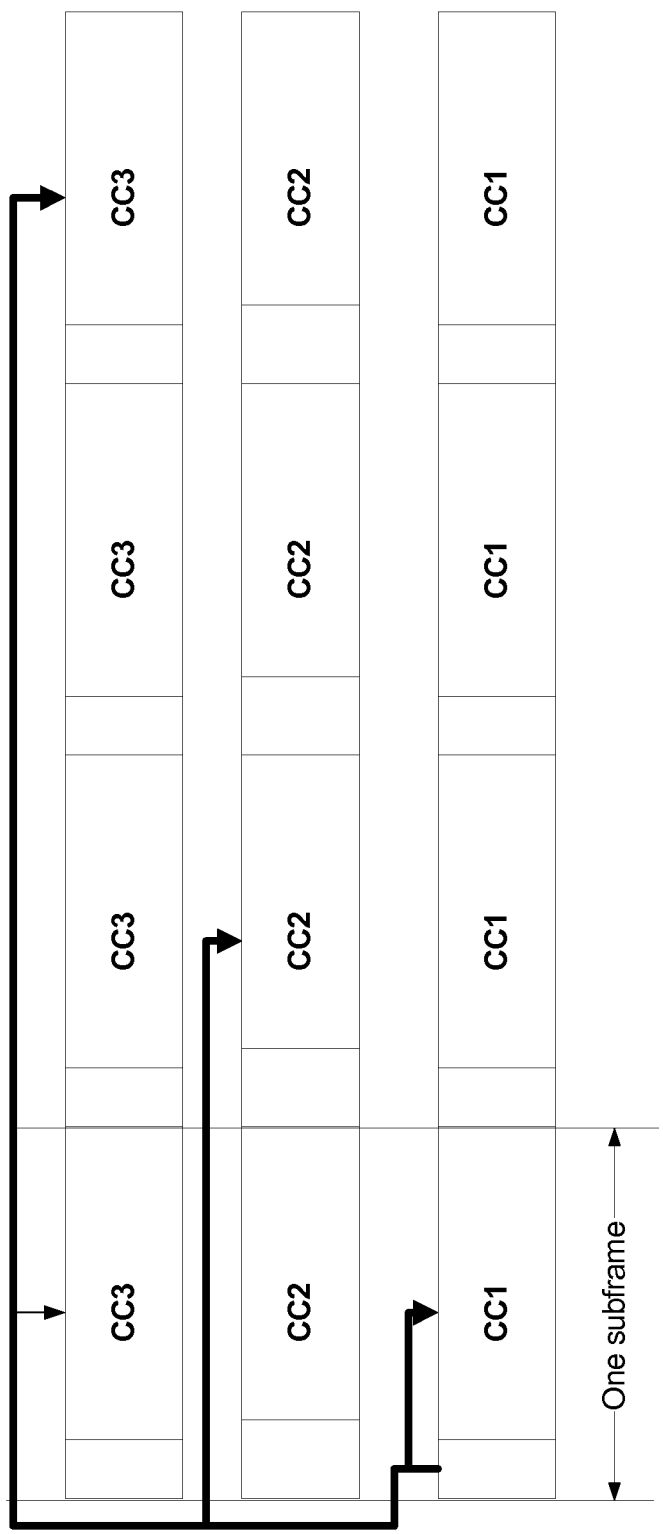

According to certain aspects, it may also be possible to schedule multiple data (downlink and/or uplink) transmission over multiple subframes, for example, as illustrated in FIG. 7. In this case, additional CIF mapping can be defined, for example:

101: CC3, n and n+3

In case of multi-subframe scheduling, there may still be an issue of how to apply various scheduling information. As an example, in the case of power control commands, a command may be applied to all the scheduled PUSCH transmissions, or only to the first PUSCH transmission in the set, or other combinations. As another example, for aperiodic CQI reports, the report may be carried only in the first PUSCH transmission (e.g., as in LTE Rel-8 configuration #0), although other variations may be possible.

According to certain aspects, PUCCH power control commands (carried in DL DCI formats) may use the same design as for PUSCH power control described above. For a downlink assignment index (carried in DL DCI formats), the value may still indicate the accumulative number of DL assignments (as currently in LTE Rel-8 TDD), but the counter may take into account the total number of PDSCH assignments in this single PDCCH (across all subframes and/or carriers).

Figure 8A:
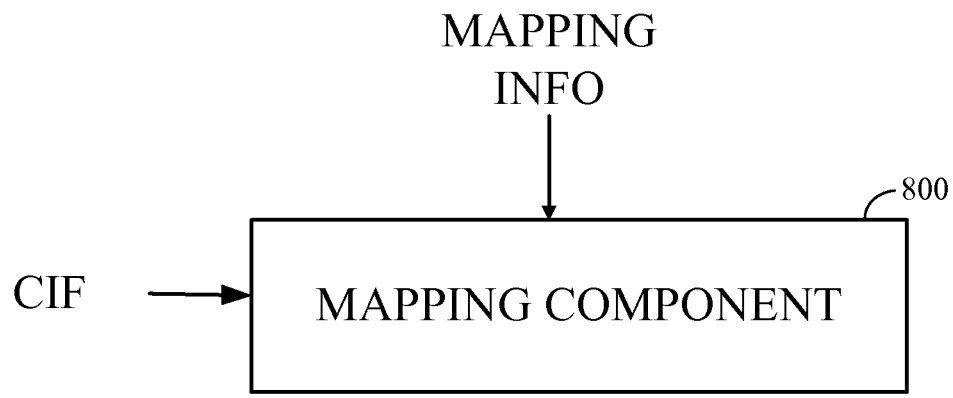
FIGS. 8A and 8B illustrate example cross-carrier/cross-subframe mapping components, in accordance with certain aspects of the present disclosure.
Figure 8B:
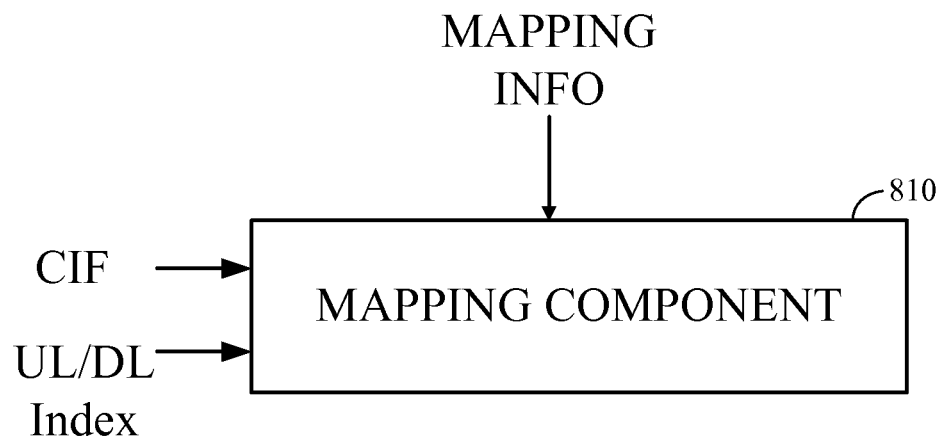

As illustrated in FIG. 8A, different values of a single xSF/CIF field may be mapped to different combinations of subframes and/or carriers. As an alternative, as indicated in FIG. 8B, an indication of cross-carrier and multi-subframe scheduling may be realized via the combination of two or more fields. As an example, for downlink assignments, a CIF plus a DL index may be used. The DL index may be similarly defined as that of UL index as in DCI format 0 in LTE Rel-8, while the number of bits for DL index can be per specification or layer 3 configured. For uplink assignments, CIF plus a UL index may be used. Again, the number of bits for UL index can be per specification or layer 3 configured.

For the purposes of interference coordination among different cells, it may be desirable that UEs maintain different power control parameters for different carriers and/or subframes. To accomplish this, various mechanisms may be in place. First, the configuration of resources (carrier-subframe combinations) with separate power control parameters may be specified (e.g., agreed upon by a standard or specified via layer 3 signaling). Second, the mapping of DL power control commands to UL resources may be implicit (e.g., through a fixed mapping of UL resources to corresponding DL resources or control elements), or explicit (e.g., through a corresponding CFI and/or UL subframe index), or more generally, a resource index.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
generating control information for scheduling transmissions in one or more subframes;
transmitting the control information to a user equipment in a downlink control channel with at least one field, wherein different values of the at least one field indicate different combinations of one or more subframes and one or more component carriers to which the control information is to be applied.

2. The method of claim 1, further comprising:
signaling, to the user equipment, a mapping of values of the at least one field to different combinations of subframes and component carriers.

3. The method of claim 2, wherein the signaling comprises:
signaling a first mapping of values of the at least one field to different combinations of subframes and component carriers to a first user equipment; and
signaling a second mapping of values of the at least one field to different combinations of subframes and component carriers to a second user equipment.

4. The method of claim 1, wherein at least one of the values of the at least one field indicates the control information is to be applied in multiple downlink subframes of a same component carrier.

5. The method of claim 4, wherein the multiple downlink subframes comprise the downlink subframe in which the downlink control channel is transmitted.

6. The method of claim 1, wherein:
the downlink control channel is transmitted on a first component carrier; and
at least one of the values of the at least one field indicates the control information is to be applied in one or more subframes of a second component carrier.

7. The method of claim 1, wherein the at least one field comprises at least two fields comprising:
a carrier indicator field; and
at least one of an uplink index or downlink index.

8. The method of claim 1, wherein the control information comprises one or more power control commands.

9. The method of claim 8, wherein the at least one field indicates different power control commands are to be applied to different uplink subframes.

10. The method of claim 8, wherein the at least one field indicates different power control commands are to be applied to different component carriers.

11. A method for wireless communications, comprising:
receiving control information in a downlink control channel with at least one field, wherein different values of the at least one field indicate different combinations of one or more subframes and one or more component carriers to which the control information is to be applied; and
determining, based on a value of the at least one field, a combination of one or more subframes and one or more component carriers to which the control information is to be applied.

12. The method of claim 11, further comprising:
receiving signaling, from a base station, indicating a mapping of values of the at least one field to different combinations of subframes and component carriers.

13. The method of claim 12, wherein the indicated mapping of values is different for different User Equipments (UEs).

14. The method of claim 11, wherein at least one of the values of the at least one field indicates the control information is to be applied in multiple downlink subframes of a same component carrier.

15. The method of claim 14, wherein the multiple downlink subframes comprise the downlink subframe in which the downlink control channel is transmitted.

16. The method of claim 11, wherein:
the downlink control channel is received on a first component carrier; and
at least one of the values of the at least one field indicates the control information is to be applied in one or more subframes of a second component carrier.

17. The method of claim 11, wherein the at least one field comprises at least two field comprising:
a carrier indicator field; and
at least one of an uplink index or downlink index.

18. The method of claim 11, wherein the control information comprises one or more power control commands.

19. The method of claim 18, wherein the at least one field indicates different power control commands are to be applied to different uplink subframes.

20. The method of claim 18, wherein the at least one field indicates different power control commands are to be applied to different component carriers.

21. An apparatus for wireless communications, comprising:
means for generating control information for scheduling transmissions in one or more subframes;
means for transmitting the control information to a user equipment in a downlink control channel with at least one field, wherein different values of the at least one field indicate different combinations of one or more subframes and one or more component carriers to which the control information is to be applied.

22. The apparatus of claim 21, further comprising:
means for signaling, to the user equipment, a mapping of values of the at least one field to different combinations of subframes and component carriers.

23. The apparatus of claim 22, wherein the signaling comprises:
means for signaling a first mapping of values of the at least one field to different combinations of subframes and component carriers to a first user equipment; and
means for signaling a second mapping of values of the at least one field to different combinations of subframes and component carriers to a second user equipment.

24. The apparatus of claim 21, wherein at least one of the values of the at least one field indicates the control information is to be applied in multiple downlink subframes of a same component carrier.

25. The apparatus of claim 24, wherein the multiple downlink subframes comprise the downlink subframe in which the downlink control channel is transmitted.

26. The apparatus of claim 21, wherein:
the downlink control channel is transmitted on a first component carrier; and
at least one of the values of the at least one field indicates the control information is to be applied in one or more subframes of a second component carrier.

27. The apparatus of claim 21, wherein the at least one field comprises at least two fields comprising:
a carrier indicator field; and
at least one of an uplink index or downlink index.

28. The apparatus of claim 21, wherein the control information comprises one or more power control commands.

29. The apparatus of claim 28, wherein the at least one field indicates different power control commands are to be applied to different uplink subframes.

30. The apparatus of claim 28, wherein the at least one field indicates different power control commands are to be applied to different component carriers.

31. An apparatus for wireless communications, comprising:
means for receiving control information in a downlink control channel with at least one field, wherein different values of the at least one field indicate different combinations of one or more subframes and one or more component carriers to which the control information is to be applied; and
means for determining, based on a value of the at least one field, a combination of one or more subframes and one or more component carriers to which the control information is to be applied.

32. The apparatus of claim 31, further comprising:
means for receiving signaling, from a base station, indicating a mapping of values of the at least one field to different combinations of subframes and component carriers.

33. The apparatus of claim 32, wherein the indicated mapping of values is different for different User Equipments (UEs).

34. The apparatus of claim 31, wherein at least one of the values of the at least one field indicates the control information is to be applied in multiple downlink subframes of a same component carrier.

35. The apparatus of claim 34, wherein the multiple downlink subframes comprise the downlink subframe in which the downlink control channel is transmitted.

36. The apparatus of claim 31, wherein:
the downlink control channel is received on a first component carrier; and
at least one of the values of the at least one field indicates the control information is to be applied in one or more subframes of a second component carrier.

37. The apparatus of claim 31, wherein the at least one field comprises at least two field comprising:
a carrier indicator field; and
at least one of an uplink index or downlink index.

38. The apparatus of claim 31, wherein the control information comprises one or more power control commands.

39. The apparatus of claim 38, wherein the at least one field indicates different power control commands are to be applied to different uplink subframes.

40. The apparatus of claim 38, wherein the at least one field indicates different power control commands are to be applied to different component carriers.

41. An apparatus for wireless communications, comprising:
- a generating component configured to generate control information for scheduling transmissions in one or more subframes;
- a transmitting component configured to transmit the control information to a user equipment in a downlink control channel with at least one field, wherein different values of the at least one field indicate different combinations of one or more subframes and one or more component carriers to which the control information is to be applied.

42. An apparatus for wireless communications, comprising:
- a receiving component configured to receive control information in a downlink control channel with at least one field, wherein different values of the at least one field indicate different combinations of one or more subframes and one or more component carriers to which the control information is to be applied; and
- a scheduling component configured to determine, based on a value of the at least one field, a combination of one or more subframes and one or more component carriers to which the control information is to be applied.

43. A computer-program product for wireless communications, comprising a non-transitory computer readable medium having instructions stored thereon, the instructions being executable by one or more processors and the instructions comprising:
- instructions for generating control information for scheduling transmissions in one or more subframes;
- instructions for transmitting the control information to a user equipment in a downlink control channel with at least one field, wherein different values of the at least one field indicate different combinations of one or more subframes and one or more component carriers to which the control information is to be applied.

44. A computer-program product for wireless communications, comprising a non-transitory computer readable medium having instructions stored thereon, the instructions being executable by one or more processors and the instructions comprising:
- instructions for receiving control information in a downlink control channel with at least one field, wherein different values of the at least one field indicate different combinations of one or more subframes and one or more component carriers to which the control information is to be applied; and
- instructions for determining, based on a value of the at least one field, a combination of one or more subframes and one or more component carriers to which the control information is to be applied.

* * * * *